United States Patent [19]

Onitsuka et al.

[11] Patent Number: 4,670,805
[45] Date of Patent: Jun. 2, 1987

[54] SINTERED BODY FOR MAGNETIC HEAD AND PROCESS FOR PRODUCING THE SAME

[75] Inventors: Katsuhiko Onitsuka; Hideo Emura, both of Kokubu, Japan

[73] Assignee: Kyocera Corporation, Kyoto, Japan

[21] Appl. No.: 813,697

[22] Filed: Dec. 27, 1985

[30] Foreign Application Priority Data

Dec. 28, 1984 [JP] Japan .................................. 59-279177
Feb. 26, 1985 [JP] Japan .................................. 60-37933

[51] Int. Cl.$^4$ ............................................. C04B 35/36
[52] U.S. Cl. .................................... 360/103; 501/134; 501/135; 501/136
[58] Field of Search ....................... 106/136, 135, 134; 360/103

[56] References Cited

U.S. PATENT DOCUMENTS 2,768,901 10/1956 Tombs .................................. 501/137
4,489,168 12/1984 Wank et al. ......................... 501/136

FOREIGN PATENT DOCUMENTS

727339 3/1955 United Kingdom ................ 501/136

Primary Examiner—William R. Dixon, Jr.
Assistant Examiner—A. Knab
Attorney, Agent, or Firm—Spensley Horn Jubas & Lubitz

[57] ABSTRACT

Disclosed is a slider for a magnetic head, which is composed of a sintered body of a three-component or four-component composition comprising $TiO_2$, CaO and ZnO or $TiO_2$, CaO, ZnO and $ZrO_2$. This sintered body has a texture in which the $ZnTiO_4$ phase or a combination of the $ZnTiO_4$ phase and $CaZrTi_2O_7$ phase is dispersed in the $CaTiO_3$ phase. The sintered body is excellent in the cutting property and the chipping resistance characteristic.

13 Claims, 6 Drawing Figures

X-RAY DIFFRACTION PATTERN OF SINTERED FACE OF BODY SINTERED AT 1200°C
(SAMPLE No. 14, TABLE 1, $TiO_2$-CaO-ZnO THREE-COMPONENT SYSTEM)

SINTERED BODY FOR MAGNETIC HEAD AND PROCESS FOR PRODUCING THE SAME

BACKGROUND OF THE INVENTION

1. Field of the Invention

The present invention relates to a ceramic composition for a magnetic head-supporting member (generally called "slider") to which magnetic pole pieces of a magnetic head used for an electronic computer are attached. More particularly, the present invention relates to a sintered ceramic body excellent in the cutting property and the chipping resistance.

2. Description of the Prior Art

In magnetic head-supporting members (referred to as "sliders" hereinafter), it is desired that the thermal expansion coefficient of the slider can be easily adapted to that of the magnetic head supported by the slider by changing the composition of the ceramic used for the slider. Since very small magnetic pole pieces are supported on the slider, very precise processing is necessary for the slider, and therefore, it is desired that the material of the slider should be stable against processing and be excellent in the processability. Namely, it is required that the resistance against grinding (cutting) should be low and the chipping resistance should be excellent.

As the slider material adaptable to Ni—Zn ferrite, there has been used forsterite or barium titanate, and the thermal expansion coefficient of this known slider material is substantially equal to the thermal expansion coefficient of Ni—Zn ferrite, which is 90 to $98 \times 10^{-7}/°C$. However, when forsterite or barium titanate is used for Mn—Zn ferrite, since Mn—Zn ferrite has such as high thermal expansion coefficient as 100 to $120 \times 10^{-7}/°C$., because of the difference of the thermal expansion between the slider material and Mn—Zn ferrite by the heat treatment of about 400° C. at the glass-fusion-bonding step, cracking is caused or strain is left in the slider material and peeling of glass is readily caused during the processing. Accordingly, a forsterite or barium titanate type composition cannot be used for Mn—Zn ferrite.

Calcium titanate is used as the slider material that can be adapted to Mn—Zn ferrite. The thermal expansion coefficient of calcium titanate is substantially equal to that of Mn—Zn ferrite, which is 100 to $120 \times 10^{-7}/°C$.

However, in a ceramic composed mainly of calcium titanate, chipping is readily caused at the machining step and the load resistance is large at the grinding step, and therefore, this material is defective in that the processability is poor.

SUMMARY OF THE INVENTION

It is therefore a primary object of the present invention to provide a sintered ceramic body for a magnetic head, which can be used in a broad range of the thermal expansion coefficient and is excellent in the processability, especially the cutting property and the chipping resistance characteristic.

Under the above-mentioned background, we made research, and as the result, it was found that if at least the $Zn_2TiO_4$ phase or its combination with the $CaZrTi_2O_7$ phase is dispersed in the $CaTiO_3$ phase in a sintered body, there can be obtained a sintered ceramic body for a magnetic head, which can be applied to magnetic heads within a broad range of the thermal expansion coefficient (94 to $115 \times 10^{-7}/°C$.), for example, magnetic heads of Ni—Zn ferrite and Mn—Zn ferrite, and which shows a low grinding resistance at the machine-processing step and is excellent in the processing characteristics such as the chipping resistance characteristic.

In accordance with one fundamental aspect of the present invention, there is provided a sintered ceramic body for a magnetic head, which is composed of a sintered body of titania, calcia and zinc oxide, wherein the titania/calcia molar ratio is at least 1 and the sintered body has a crystal structure in which the $Zn_2TiO_4$ phase is dispersed in the $CaTiO_3$ phase.

In accordance with another aspect of the present invention, there is provided a sintered ceramic body for a magnetic head, which is composed of a sintered body of titania, calcia, zinc oxide and zirconia, said sintered body having a crystal structure in which the $Zn_2TiO_4$ phase and $CaZrTi_2O_7$ phase are dispersed in the $CaTiO_3$ phase.

The above-mentioned three-component ceramic composition preferably comprises 40 to 60 mole % of titania, 10 to 50 mole % of calcia and 2 to 50 mole % of zinc oxide and has a titania/calcia molar ratio of at least 1.

The above-mentioned four-component ceramic composition comprises 45 to 60 mole % of titania, 30 to 45 mole % of calcia and 2 to 15 mole % of zinc oxide based on the three components and 3 to 15% by weight of zirconia based on the foregoing three components.

DETAILED DESCRIPTION OF THE PREFERRED EMBODIMENTS

Figure 1:
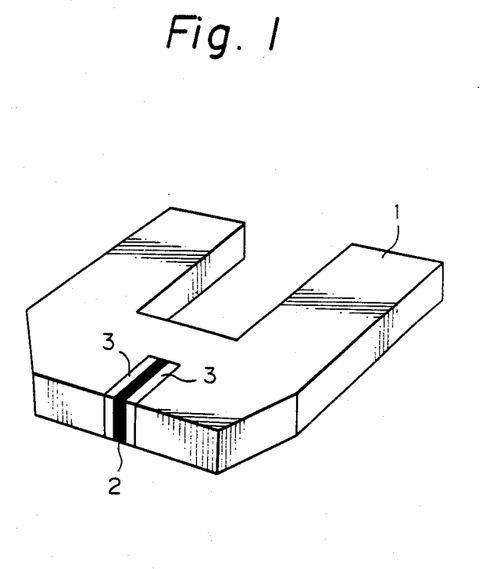
FIG. 1 is a perspective view illustrating the outline of the structure of the magnetic head.

Referring to FIG. 1 illustrating the outline of the structure of the present invention, a magnetic pole piece (ferrite core) 2 is fitted in a vacant space of a slider 1 composed of a ceramic and both the sides of the magnetic pole piece 2 are heat-bonded to the slider 1 through bonding glass 3,3 to construct a magnetic head. Accordingly, if there is a great difference of the thermal expansion coefficient between the slider and the ferrite core, by the heat history at the glass-fusion-bonding step, cracking is caused or strain is left in these materials, and peeling of glass is caused during the assembling step. Therefore, the ceramic composition and component ratio of the ceramic material should be selected so that the thermal expansion coefficient of the slider is substantially in agreement with that of the ferrite core.

One of the prominent characteristic features of the sintered ceramic body of the present invention is that the zinc titanate ($Zn_2TiO_4$) phase or a combination of the zinc titanate phase and the calcium zirconium titanate ($CaZrTi_2O_7$) phase is dispersed in the texture composed mainly of the calcium titanate ($CaTiO_3$) phase.

Figure 2:
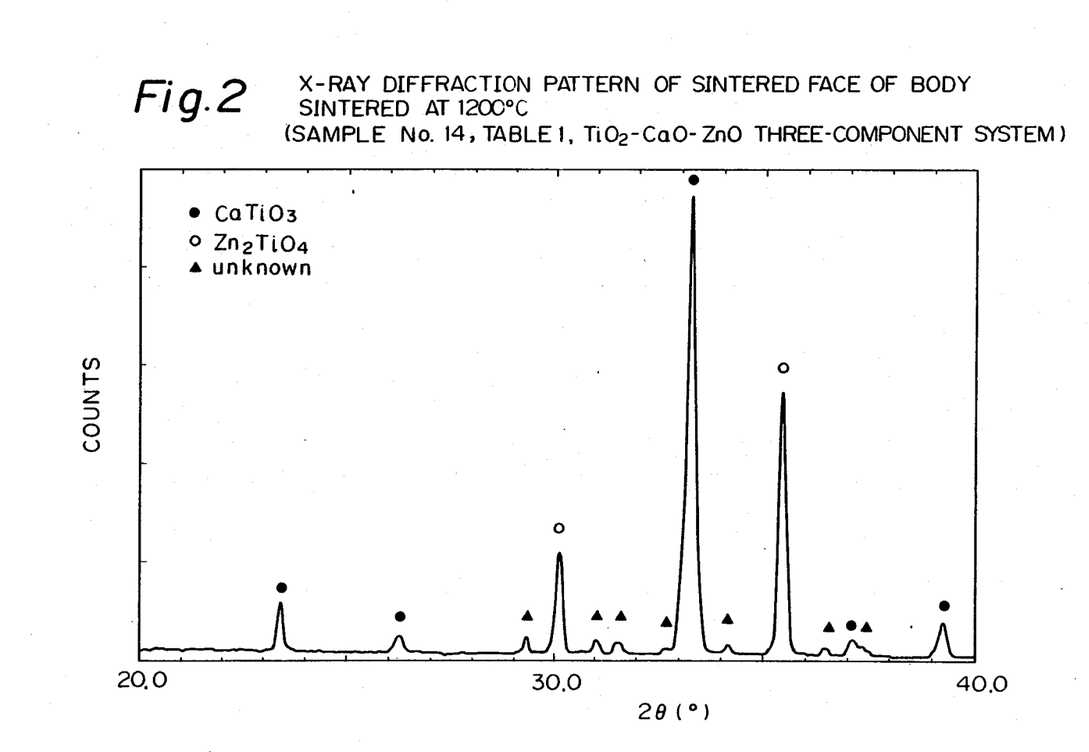
FIG. 2 is an X-ray diffraction diagram of a typical instance of the three-component sintered ceramic body of the present invention.
Figure 3:
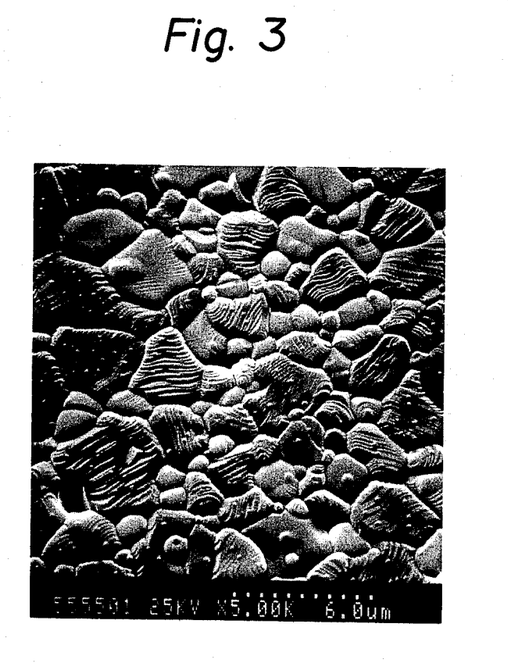
FIG. 3 is a scanning electron microscope showing the micro-structure of crystal grains of the sintered ceramic body shown in FIG. 2.

Referring to FIG. 2, the three-component sintered body of the present invention has a strong diffraction peak based on $CaTiO_3$ and a diffraction peak based on $Zn_2TiO_4$. In the X-ray diffraction pattern shown in FIG. 2, there are present an X-ray-diffractometrically unknown phase, i.e. a phase of a compound presumed to comprise three components of $TiO_2$, CaO and ZnO, for example, $(Zn,Ca)TiO_4$. In the sintered body of the present invention, by virtue of the above-mentioned micro-structure, the crystal grain size is controlled to less than 5.0 microns, especially less than 3.0 microns, in each of the above-mentioned phases, as shown in FIG. 3. This is an unexpected fact.

The reason why the $Zn_2TiO_4$ phase is dispersed in the conventional texture composed mainly of the calcium titanate ($CaTiO_3$) phase is that by forming the $Zn_2TiO_4$ phase at a low temperature from zinc oxide (ZnO) of the starting material and the excessive titania ($TiO_2$) component not participating in formation of the $CaTiO_3$ phase at the calcining step in the sintered body-preparing process, abnormal grain growth of $CaTiO_3$ and rutile ($TiO_2$), causing formation of voids, at the calcining step can be controlled, and the sintering temperature can be maintained at a level lower by 50° to 100° C. than the sintering temperature adopted in the conventional technique, with the result that the sizes of crystal grains can be uniformalized. Moreover, by virtue of this feature, the unit of breaking at the grinding step can be greatly reduced as compared with the breaking unit in the conventional $CaTiO_3$—$TiO_2$ texture, and the chipping resistance characteristic is improved and the resistance against the grinding operation is reduced.

Figure 4:
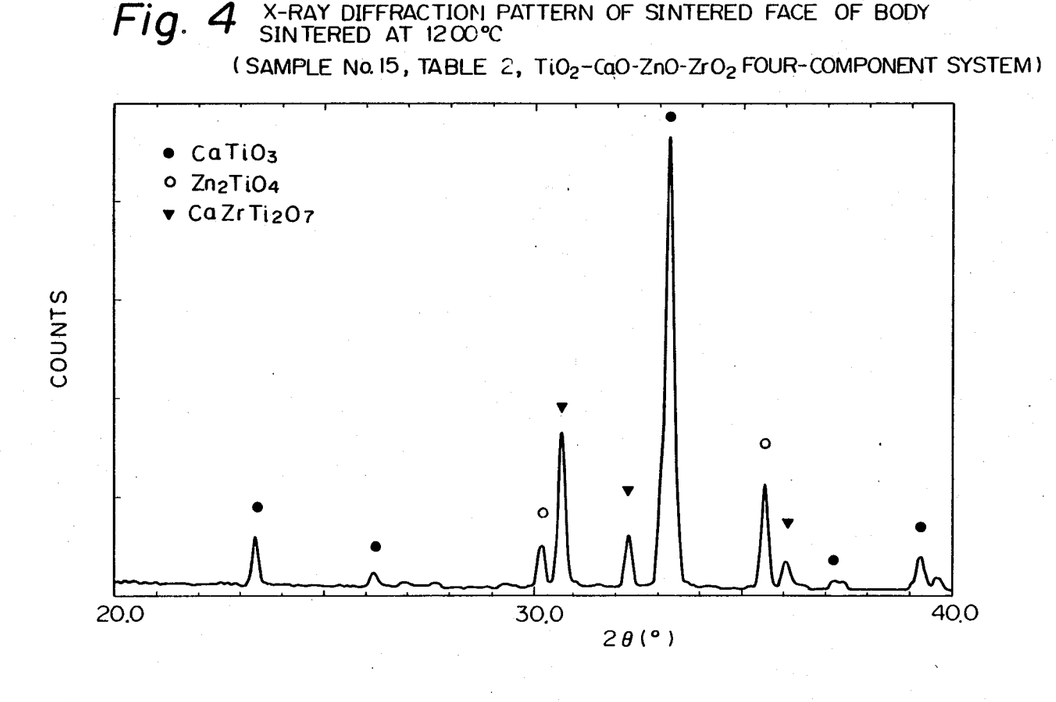
FIG. 4 is an X-ray diffraction diagram of a typical instance of the four-component sintered ceramic body of the present invention.
Figure 5:
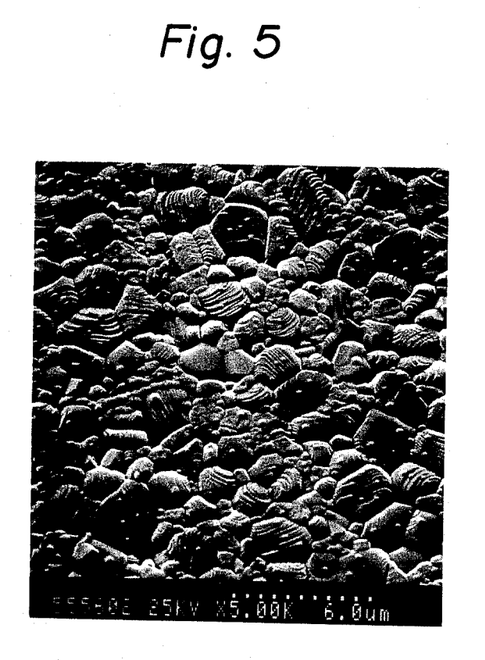
FIG. 5 is a scanning electron microscope showing the micro-structure of crystal grains of the sintered ceramic body shown in FIG. 4.

Referring to FIG. 4, in the four-component sintered body of the present invention, a diffraction peak based on $CaZrTiO_2O_7$ appears in addition to the above-mentioned strong peak based on $CaTiO_3$ and the above-mentioned diffraction peaks based on $Zn_2TiO_4$. Also in this four-component sintered body, by virtue of the above-mentioned micro-structure, the crystal grain size is controlled to less than 3.0 microns, especially less than 2.0 microns, in each phase. The reason why the $CaZrTi_2O_7$ phase is dispersed in the $CaTiO_3$ texture is that by forming the $CaZrTi_2O_7$ phase from zirconia ($ZrO_2$) of the starting material at the sintering step, the growth of grains in the $CaTiO_3$ phase is controlled and a sintered body having a micro-structure is obtained. Furthermore, there can be attained an effect of reducing the breaking unit at the grinding operation, and therefore, reduction of the grinding resistance, intended in the present invention, can be attained and the processing characteristics can be improved.

From the results of the analysis of the three-component sintered body of the present invention by an image analyzer, it is found that the crystal micro-structure comprises 30 to 90% by volume, especially 40 to 80% by volume, of the $CaTiO_3$ phase and 5 to 60% by volume, especially 10 to 40% by volume, of the $Zn_2TiO_4$ phase. The crystal phase considered to consist of $(Ca,Zn)TiO_4$ is present in an amount of up to 30% by volume, especially up to 20% by volume. It is preferred that free CaO be not contained in an X-ray-diffractometrically detectable amount in the three-component sintered body. From this viewpoint, it is indispensable that the $TiO_2$/CaO molar ratio should be at least 1. Moreover, it is preferred that the contents of free $TiO_2$ and ZnO be as low as possible. Namely, the $TiO_2$ content should be lower than 5% by volume and the ZnO content should be lower than 0.1% by volume.

In the four-component sintered body of the present invention, the $CaTiO_3$ phase may be present in a little smaller amount than in the three-component sintered body, and it is preferred that the $CaTiO_3$ phase content be 50 to 90% by volume, especially 60 to 90% by volume. Furthermore, it is preferred that the $Zn_2TiO_4$ content be 1 to 20% by volume, especially 2 to 10% by volume, and that the $CaZrTi_2O_7$ content be 5 to 30% by volume. If the content of the $TiO_2$ phase exceeds 5% by volume, the thermal expansion coefficient is decreased and uneven coloring is caused. If the content of the ZnO phase exceeds 5% by volume, the insulating property is degraded and uneven coloring is readily caused.

In the sintered body of the present invention, the porosity should be lower than 0.5%, especially lower than 0.1%. It is preferred that the thermal expansion coefficient be 100 to $115 \times 10^{-7}$/°C. (40° to 400° C.).

The sintered ceramic body of the present invention is prepared according to the so-called cold-press atmospheric pressure sintering method in which a powdery mixture of the above-mentioned three or four components is molded into a predetermined shape and the molded body is sintered under atmospheric pressure, or the so-called hot-press method in which sintering is carried out while the powdery mixture is being molded into a predetermined shape. Furthermore, there may be adopted the method in which a molded body as described above is preliminarily sintered and the preliminarily sintered molded body is subjected to hot isostatic pressing (HIP) in an inert atmosphere, and the method in which the molded body is encapsulated with a low-melting-point cover of glass or the like and the encapsulated molded body is subjected to hot isostatic pressing in an inert atmosphere. If these hot isostatic pressing methods are adopted, formation of voids in the sintered molded body can be effectively prevented.

In the production of the sintered body of the present invention, the mixing ratios of the respective components are limited, and in case of the three-component sintered body, it is preferred that the mixing ratio of $TiO_2$ be 40 to 60 mole %, especially 45 to 55 mole %, the mixing ratio of CaO be 10 to 50 mole %, especially 30 to 45 mole %, and the mixing ratio of ZnO be 2 to 50 mole %, especially 5 to 20 mole %. If the mixing ratio of titania ($TiO_2$) is lower than 40 mole %, the CaO or ZnO phase is present in too large an amount in the texture, and the sintered body is readily influenced by the sintering atmosphere and color unevenness is readily caused in the sintered body. If the mixing ratio of titania ($TiO_2$) is higher than 60 mole %, the rutile ($TiO_2$) phase appears in the texture and the thermal expansion coefficient is lowered to 70 to $90 \times 10^{-7}$/°C.

If the $TiO_2$/CaO molar ratio is lower than 1 and the mixing ratio of calcia (CaO) exceeds 50 mole %, calcia is present in the unreacted state in the sintered body, and therefore, the sintering property is drastically degraded and the sintered body comes to have a moisture-absorbing property. If the mixing ratio of calcia (CaO) is lower than 10 mole %, since the amount of the $CaTiO_3$ phase is reduced, the thermal expansion coefficient is reduced, and the hardness becomes lower than 650 Kg/mm² (the hardness of Mn—Zn ferrite and Ni—Zn ferrite) and the sintered body is not satisfactory as a sliding member.

Zinc oxide is added so that it reacts with unreacted titania ($TiO_2$) not participating in formation of $CaTiO_3$ to form the $Zn_2TiO_4$ phase. If the mixing ratio of ZnO is lower 2 mole %, the amount of the $Zn_2TiO_4$ phase having good influences on the grinding property is reduced and the grinding property is not substantially improved. If the mixing ratio of ZnO exceeds 50 mole %, the amount of the $CaTiO_3$ phase is decreased and therefore, the thermal expansion coefficient is reduced. Furthermore, in the present invention, by addition of ZnO, the sintering temperature can be reduced by 10° to 100° C. as compared with the sintering temperature adopted for the conventional calcium titanate system, and formation of voids in the sintered body can be greatly controlled and this control is very preferable for the material of a slider.

In case of the four-component sintered body, it is preferred that the mixing ratios of $TiO_2$, CaO and ZnO be 45 to 60 mole %, 30 to 45 mole % and 2 to 15 mole %, respectively, based on the three components, and that the mixing ratio of $ZrO_2$ be 3 to 15% by weight based on the sum of the foregoing three components.

If the mixing ratio of titania ($TiO_2$) is lower than 45 mole %, any of CaO, ZnO and $ZrO_2$ is likely to be present in a single phase and the sintering property is degraded. If the mixing ratio of titania ($TiO_2$) exceeds 60 mole %, the amount of the rutile ($TiO_2$) phase is increased, and the thermal expansion coefficient is reduced below $90 \times 10^{-7}$/°C. and color unevenness is readily caused in the interior of the sintered body by the influence of the sintering atmosphere. If the mixing ratio of calcia (CaO) is lower than 30 mole %, since the amount of the $CaTiO_3$ phase is reduced, the thermal expansion coefficient is decreased, and since the amount of the $CaZrTi_2O_7$ phase having good influence on the grinding property is reduced, the grinding property is not substantially improved. If the mixing ratio of calcia exceeds 45 mole %, since calcia (CaO) is present in the unreacted state, the sintering property is drastically degraded.

If the mixing ratio of zinc oxide (ZnO) is lower than 2 mole %, at the calcining step zinc oxide slightly reacts with $TiO_2$ at low temperatures and the amount of the formed $Zn_2TiO_4$ phase is drastically decreased. Accordingly, abnormal growth of grains of $CaTiO_3$ and $TiO_2$ cannot be sufficiently controlled. If the mixing ratio of zinc oxide (ZnO) exceeds 15 mole %, the chipping resistance is degraded.

If the mixing ratio of zirconia ($ZrO_2$) is lower than 3% by weight, the amount formed of the $CaZrTi_2O_7$ phase having a low toughness and a low grinding resistance characteristic is reduced, and attainment of the intended characteristics becomes difficult. If the mixing ratio of zirconia ($ZrO_2$) exceeds 15% by weight, the $ZrO_2$ or $CaZrO_3$ phase is formed, resulting in increase of the hardness and formation of voids.

Figure 6:
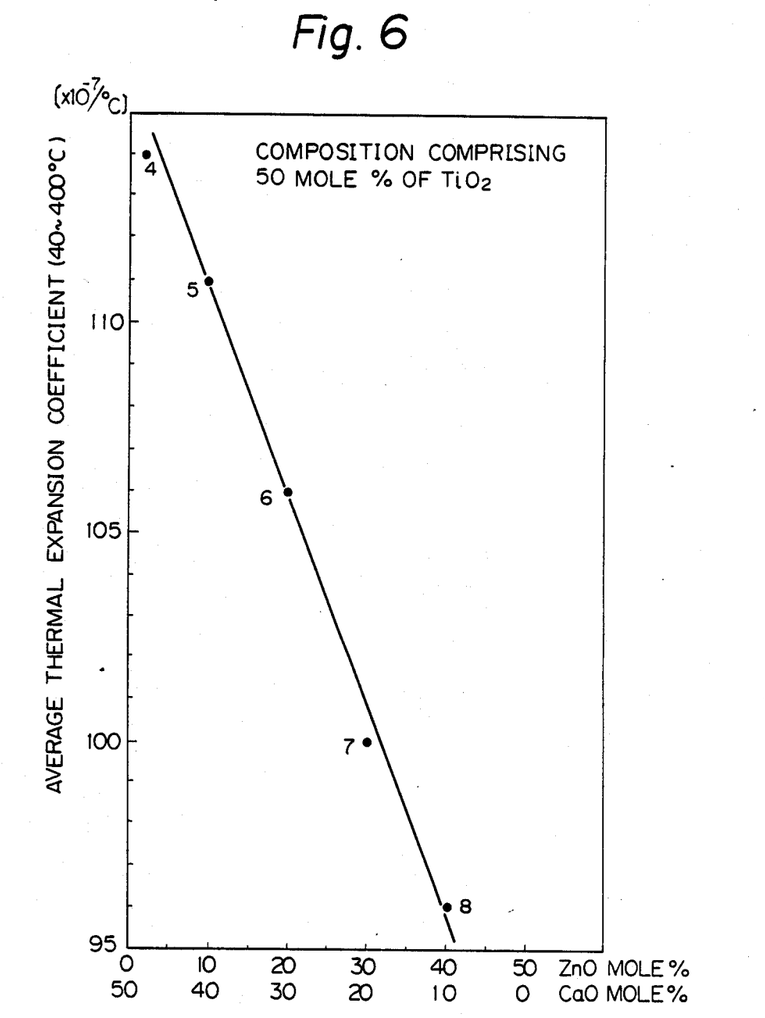
FIG. 6 is a graph illustrating the relation between the composition and the thermal expansion coefficient in the three-component sintered ceramic body of the present invention.

In the present invention, the thermal expansion coefficient can be adjusted to a desired level by changing the mixing ratios of the respective components within the above-mentioned ranges. This is another advantage of the present invention. FIG. 6 shows the change of the thermal expansion coefficient observed when the ratio between ZnO and CaO in the three-component sintered is changed. From FIG. 6, it is seen that it is easy to set or adjust the thermal expansion coefficient by changing the ratio between the two components.

The sintered body of the present invention may further comprise components in addition to the above-mentioned components.

For example, when a pulverizing medium such as a ball is used for mixing and pulverizing the components, the ingredients contained in the pulverizing medium are inevitably included in the pulverized mixture. Incorporation of these ingredients is allowed so far as they do not react with the indispensable components or they have no bad influences on the properties of the sintered body. Ordinarily, it is preferred that the amount of these ingredients be up to 5% by weight.

Alumina ($Al_2O_3$) can be mentioned as a component which may be incorporated in the sintered body of the present invention. Furthermore, there may be adopted a method in which zirconia or calcium titanate is incorporated as an additive to the pulverizing ball or a ball composed of zirconia or calcium titanate is used as the pulverizing ball and zirconia or calcium titanate as an indispensable component is included into the pulverized mixture.

In the present invention, there is preferably adopted a method in which powders of the starting materials are mixed, the powdery mixture is once calcined, the calcined mixture is molded into a predetermined shape, and the molded body is sintered.

It is generally preferred that the calcination temperature be 900° to 200° C. It also is preferred that sintering be carried out at 1150° to 1350° C. in air. The HIP treatment of the sintered body is preferably carried out in an inert atmosphere such as argon, helium or nitrogen under a pressure of 1500 to 2000 atmospheres at a temperature of 1100° to 1350° C.

The present invention will now be described in detail with reference to the following examples that by no means limit the scope of the invention.

EXAMPLE 1

Titania ($TiO_2$) as the titania source, calcium carbonate ($CaCO_3$), calcium hydroxide ($Ca(OH)_2$) or calcium chloride ($CaCl_2$) as the calcia source and zinc flour (ZnO) as the zinc oxide source, each being a commercially available industrial starting material (having a purity of 98% or higher), were weighed so that a composition shown in Table 1 was obtained, and the starting materials were wet-mixed by using a ball mill. The mixture was dried and calcined at 900° to 1100° C. for 1 to 2 hours in air. Then, the calcination product was finely pulverized while preventing incorporation of impurities, and the finely pulverized calcination product was granulated and molded under a pressure of 1.0 to 2.0 t/cm². Then, the molded body was sintered in air at 1150° to 1300° C. to obtain samples 1 through 14 shown in Table 1.

The grinding resistance of each sample was evaluated based on the increase of the power consumption in a high-speed rotary cutter and was expressed in terms of the watt unit.

The chipping maximum diameter was determined in the following manner. Namely, the chipping depth was measured vertically from the cut face with respect to twenty specimens, and the mean value of the maximum chipping diameters within a certain distance was calculated and expressed in terms of the micron unit. Incidentally, the operating conditions of the cutter were kept constant.

The toughness as a criterion for evaluating the chipping resistance characteristic was calculated approximately from the size of the indentation formed by applying a diamond pressure element under a certain load for a certain time and the length of the crack extended from the dent according to the indentation method, and the toughness was expressed in terms of the unit of $MN/m^{3⁄2}$.

The hardness, which is another characteristic required for a slider for a magnetic head and is a criterion for evaluating the abrasion resistance, was expressed in terms of the Vickers hardness Hv (1.0) under a load of 1 Kg. The measurement and calculation were conducted according to JIS Z-2244. The unit was $Kg/mm^2$.

The sintering property was evaluated according to the following scale.

○: good (porosity lower than 0.5%)
△: medial (porosity of 0.5 to 2%)
X: bad (porosity higher than 2%)

Incidentally, the porosity was calculated by the following formula according to JIS C-2141:

$$\text{Apparent porosity} = \frac{W_3 - W_1}{W_3 - W_2} \times 100 \ (\%)$$

wherein $W_3$ stands for the weight of the water-saturated specimen measured precisely to the unit of 1 mg immediately after taking out the water-saturated specimen from water and promptly wiping away water drops on the surface by a gauze, $W_1$ stands for the dry weight of the specimen, and $W_2$ stands for the weight of the specimen in water.

ratio among the $CaTiO_3$ phase, $Zn_2TiO_4$ phase and the unknown phase.

In none of the foregoing samples, the chipping maximum diameter exceeds 50 microns, and it is obvious that these samples were excellent in the grinding resistance over the conventional samples 1 and 3 composed mainly of $CaTiO_3$.

The samples 1, 2, 3 and 9 were outside the scope of the present invention, and samples 1, 2 and 3 had a high grinding resistance and therefore, the chipping maximum diameter was large.

It is seen that since the hardness of the sample 9 was low, the sample was not suitable as a material of a slider.

EXAMPLE 2

Titanium oxide ($TiO_2$) as the titania source, calcium carbonate ($CaCO_3$), calcium chloride ($CaCl_3$) or calcium hydroxide ($Ca(OH)_2$) as the calcia source, zinc oxide as the zinc oxide source and zirconium ($ZrO_2$) as the zirconia source, each being a commercially available industrial material (having a purity of 98% or higher), were weighed so that a composition shown in Table 2 was obtained, and they were wet-mixed by using a ball mill. The mixture was dried and calcined under conditions shown in Table 2 for 1 to 2 hours. The calcined mixture was finely pulverized while preventing incorporating of impurities. The finely divided mixture was mixed with an organic binder, granulated and molded under a pressure of 1.0 to 2.0 $t/cm^2$. The molded body was sintered at a temperature shown in Table 2 in air to obtain samples 1 through 23.

With respect to each sample, the formed phases were

TABLE 1

| Sample No. | Composition (mole %) | | | Crystal phase | Processabilty | | Thermal Expansion Coefficient ($\times 10^{-7}/°C.$) | Toughness ($NM/m^{3/2}$) | Vickers Hardness Hv ($Kg/mm^2$) | Sintering Property |
|---|---|---|---|---|---|---|---|---|---|---|
| | $TiO_2$ | CaO | ZnO | | grinding resistance (W) | Chipping maxi diameter (μm) | | | | |
| 1* | 50 | 50 | 0 | CT | 610 | 68 | 116 | 1.9 | 950 | △ |
| 2* | 40 | 50 | 10 | CT + ZnT + C | 620 | 42 | 113 | 2.3 | 920 | X |
| 3* | 60 | 40 | 0 | CT + T | 580 | 57 | 105 | 2.1 | 900 | O |
| 4 | 50 | 48 | 2 | CT + ZnT | 490 | 66 | 113 | 1.9 | 900 | O |
| 5 | 50 | 40 | 10 | CT + ZnT + U | 410 | 36 | 110 | 1.8 | 880 | O |
| 6 | 50 | 30 | 20 | CT + ZnT + U | 400 | 41 | 106 | 1.7 | 830 | O |
| 7 | 50 | 20 | 30 | CT + ZnT + U | 360 | 38 | 100 | 1.8 | 780 | O |
| 8 | 50 | 10 | 40 | CT + ZnT + U | 350 | 33 | 96 | 1.9 | 700 | O |
| 9* | 50 | 0 | 50 | ZnT + T | 300 | 35 | 91 | 1.7 | 600 | O |
| 10 | 60 | 25 | 15 | CT + ZnT + T | 400 | 42 | 99 | 1.8 | 810 | O |
| 11 | 60 | 10 | 30 | CT + ZnT + T | 390 | 38 | 93 | 1.9 | 720 | O |
| 12 | 40 | 10 | 50 | CT + ZnT | 370 | 30 | 92 | 1.7 | 670 | O |
| 13 | 40 | 25 | 35 | CT + ZnT + Zn | 350 | 47 | 112 | 1.9 | 850 | O |
| 14 | 49 | 36 | 15 | CT + ZnT + U | 410 | 35 | 110 | 1.8 | 880 | O |

Note
*outside the scope of the present invention
CT: $CaTiO_3$ phase
ZnT: $Zn_2TuO_4$ phase ($2ZnO.TiO_2$)
C: CaO
Zn: ZnO
T: $TiO_2$
U: unknown The samples 4 through 8 and 10 through 14 are within the scope of the present invention. As shown in FIG. 6 (reference numerals attached to the points on the line in FIG. 6 indicate the sample numbers), when the ratio between ZnO and CaO is changed while fixing the amount of $TiO_2$ to 50 mole %, the thermal expansion coefficient value is linearly changed in the range of from 96 to 113. It is presumed that the thermal expansion coefficient will probably depend on the formation determined by the X-ray diffractometry. The grinding resistance, chipping maximum diameter, hardness and sintering property were determined and evaluated according to the methods described in Example 1. The thermal expansion coefficient was measured by a thermal expansion meter. The color unevenness was evaluated by observing the interior of the sintered body and checking whether or not the color of the interior was different from the color of the surface.

TABLE 2

| Sample No. | Composition (mole %) TiO2 | CaO | ZnO | Additive ZrO2 (% by weight) | Crystal Phase | grinding resistance (W) | Chipping maximum diameter (μm) |
|---|---|---|---|---|---|---|---|
| 1* | 50 | 40 | 10 | (0) | CT, Zn2T, U | (450) | 40 |
| 2 | 50 | 40 | 10 | 3 | CT, Zn2T, CZT2, U | 400 | 37 |
| 3 | 50 | 40 | 10 | 12 | CT, Zn2T, CZT2, U | 380 | 35 |
| 4* | 50 | 40 | 10 | (17) | CT, CZT2, CZ | (590) | (55) |
| 5 | 60 | 38 | 2 | 5 | CT, Zn2T, CZT2 | 420 | 50 |
| 6* | 60 | 30 | 10 | (2) | CT, Zn2T, T | 380 | 40 |
| 7 | 60 | 30 | 10 | 15 | CT, Zn2T, CZT2, U | 390 | 45 |
| 8* | 55 | 44 | (1) | 10 | CT, CZT2 | (470) | 42 |
| 9 | 55 | 35 | 10 | 10 | CT, Zn2T, CZT2, U | 360 | 40 |
| 10 | 55 | 30 | 15 | 10 | CT, Zn2T, CZT2, U | 400 | 35 |
| 11 | 50 | 35 | 15 | 10 | CT, Zn2T, CZT2, U | 350 | 45 |
| 12* | 50 | 30 | (20) | 10 | CT, Zn2T, CZT2, Zn, U | 430 | (60) |
| 13 | 58 | 37 | 5 | 5 | CT, Zn2T, CZT2, U | 390 | 50 |
| 14* | (65) | 30 | 5 | 5 | CT, Zn2T, CZT2, T, U | 440 | (55) |
| 15 | 52 | 43 | 5 | 5 | CT, Zn2T, CZT2, U | 330 | 40 |
| 16* | 55 | 45 | 0 | 0 | CT, T | (610) | 65 |
| 17* | (43) | 42 | 15 | 5 | CT, Zn2T, CZT2, C, U | — | — |
| 18* | 60 | (25) | 15 | 5 | CT, Zn2T, CZT2, T, U | (500) | 53 |
| 19* | 50 | (48) | 2 | 3 | CT, Zn2T, CZT2, C | — | — |
| 20* | 50 | 40 | 10 | 3 | CT, Zn2T, CZT2, U | 380 | 50 |
| 21* | 55 | 35 | 10 | 10 | CT, Zn2T, CZT2, U | 350 | 60 |
| 22* | 50 | 40 | 10 | 3 | CT, Zn2T, CZT2, U | — | — |
| 23* | 60 | 30 | 10 | 15 | CT, Zn2T, CZT2, U | — | — |

| Sample No. | Thermal Expansion Coefficient ($\times 10^{-7}$/°C.) | Hardness HV (1.0) (Kg/mm$^2$) | Calcination Temperature (°C.) | Sintering Temperature (°C.) | Sintering Property | Color Unevenness |
|---|---|---|---|---|---|---|
| 1* | 111 | 900 | 950 | 1170 | O | not observed |
| 2 | 110 | 910 | 950 | 1150 | O | not observed |
| 3 | 106 | 930 | 1050 | 1280 | O | not observed |
| 4* | 104 | (1020) | 1050 | 1350 | (Δ) | not observed |
| 5 | 104 | 930 | 1100 | 1250 | O | not observed |
| 6* | 102 | 900 | 1000 | 1200 | O | observed |
| 7 | 94 | 970 | 1100 | 1300 | O | not observed |
| 8* | 108 | 950 | 1200 | 1350 | O | not observed |
| 9 | 105 | 850 | 1150 | 1320 | O | not observed |
| 10 | 103 | 890 | 1050 | 1250 | O | not observed |
| 11 | 108 | 870 | 1050 | 1250 | O | not observed |
| 12* | 97 | 780 | 1050 | 1200 | O | observed |
| 13 | 103 | 940 | 1050 | 1250 | O | not observed |
| 14* | (90) | 920 | 1100 | 1300 | O | observed |
| 15 | 115 | 850 | 1050 | 1200 | O | not observed |
| 16* | 110 | 950 | 1200 | 1350 | O | observed |
| 17* | — | — | 1100 | 1350 | (X) | not observed |
| 18* | (92) | — | 1000 | 1280 | O | observed |
| 19* | — | — | 1150 | 1350 | (X) | not observed |
| 20* | 110 | 880 | (890) | 1150 | (Δ) | not observed |
| 21* | 104 | 830 | (1250) | 1320 | (Δ) | not observed |
| 22* | — | — | 950 | (1100) | (X) | not observed |
| 23* | — | — | 1100 | (1380) | (X) | not observed |

Note
*outside the scope of the present invention
CT: CaTiO3 phase
Zn2T: Zn2TiO4 phase (2ZnO.TiO2)
CZT2: CaZrTi2O7 phase (CaO.ZrO2.2TiO2)
CZ: CaZrO3 phase
T: TiO2 phase
C: CaO phase
Zn: ZnO phase
U: unknown
(—): data omitted because of insufficient sintering The samples 2, 3, 5, 7, 9 through 11, 13 and 15 were within the scope of the present invention. In each of these samples, the grinding resistance was much lower than that of the conventional sample 16 of the TiO2—CaO system and also lower than that of the sample 1 having no ZrO2 incorporated therein. Moreover, in none of the samples of the present invention, the chipping maximum diameter exceeded 50 microns, and the chipping resistance was improved in the samples of the present invention.

In contrast, the samples 1, 4, 6, 8, 12, 14 and 16 through 19 were outside the scope of the present invention with respect to the composition and the samples 20 through 23 were outside the scope of the present invention with respect to the calcination temperature and sintering temperature. These samples were defective in the grinding resistance, the chipping maximum diameter, the thermal expansion coefficient, the hardness, the sintering property and/or the color unevenness, and they were not suitable as the material for a magnetic head.

As is apparent from the foregoing description, the thermal expansion coefficient of the sintered body of the present invention, in which the Zn2TiO4 phase or a combination of the Zn2TiO4 phase and the CaZrTi2C7 phase is uniformly dispersed in the CaTiO2 phase can be made completely in agreement with those of various magnetic heads having a thermal expansion coefficient in the range of 94 to $115 \times 10^{-7}/°C$., and the machine processability of the sintered body is highly improved. Moreover, the color unevenness owing to the change of the atmosphere at the glass-fusion-bonding step is not caused and the pore distribution is good. Furthermore, the appropriate sintering temperature is lower by about 50° to about 100° C. than that of the covnentional $TiO_2$—CaO material, and an energy-saving effect can be attained. Still further, when the sintered body of the present invention is mirror-polished, the surface condition is very good and the pore distribution is considerably improved. Accordingly, the present invention is advantageous also from the viewpoint of the quality.

We claim:

1. A sintered ceramic body for use in a magnetic head, which is obtained by sintering a composition consisting essentially of:
    40 to 60 mole % of titania;
    10 to 50 mole % of calcia; and
    2 to 50 mole % of zinc oxide, wherein the titania/calcia molar ratio is at least 1, and the sintered body has a crystal structure in which a $Zn_2TiO_4$ phase is dispersed in a $CaTiO_3$ phase.

2. A sintered ceramic body as set forth in claim 1, wherein the $CaTiO_3$ phase is contained in an amount of 30 to 90% by volume and the $Zn_2TiO_4$ phase is contained in an amount of 5 to 60% by volume.

3. A sintered ceramic body as set forth in claim 1, wherein the crystal grain size of each phase is less than 3.0 microns.

4. A sintered ceramic body for use in a magnetic head, which is obtained by sintering a composition consisting essentially of:
    45 to 60 mole % of titania;
    30 to 45 mole % of calcia;
    2 to 15 mole % of zinc oxide based on the three components; and
    3 to 15% by weight of zirconia based on said three components, said sintered body having a crystal structure in which a $Zn_2TiO_4$ phase and a $CaZrTi_2O_7$ phase are dispersed in a $CaTiO_3$ phase.

5. A sintered ceramic body as set forth in claim 4, wherein the $CaTiO_3$ phase is contained in an amount of 50 to 90% by volume, the $Zn_2TiO_4$ phase is contained in an amount of 1 to 20% by volume and the $CaZrTi_2O_7$ phase is contained in an amount of 5 to 30% in volume.

6. A sintered ceramic body as set forth in claim 4, wherein the crystal grain size of each phase is less than 2.0 microns.

7. A ceramic composition consisting essentially of 40 to 60 mole % of titania, 10 to 50 mole % of calcia and 2 to 50 mole % of zinc oxide, wherein the $TiO_2/CaO$ molar ratio is at least 1.

8. A ceramic composition consisting essentially of 45 to 60 mole % of titania, 30 to 45 mole % of calcia and 2 to 15 mole % of zinc oxide based on the three component and 3 to 15% by weight of zirconia based on said three components.

9. A process for making a ceramic body, comprising the steps of:
    (i) mixing together a composition consisting essentially of
        40 to 60 mole % of titania;
        10 to 50 mole % of calcia;
        2 to 50 mole % of zinc oxide, so that the titania/calcia molar ration is at least 1; and
    (ii) sintering the composition to form a sintered body having a crystal structure in which a $Zn_2TiO_4$ phase is dispersed in $CaTiO_3$ phase.

10. A process for making a ceramic body, comprising the steps of:
    (i) mixing together a composition consisting essentially of
        45 to 60 mole % of titania;
        30 to 45 mole % of calcia;
        2 to 15 mole % of zinc oxide;
    (ii) mixing into said composition a component consisting essentially of
        3 to 15% by weight of zirconia based on the sum of titania, calcia and zinc oxide;
    (iii) sintering the composition resulting from step (ii) to form a sintered body having a crystal structure in which a $Zn_2TiO_4$ phase and a $CaZrTi_2O_7$ phase are dispersed in a $CaTiO_3$ phase.

11. A sintered ceramic body for use in a magnetic head, which is obtained by sintering a composition consisting essentially of:
    45 to 55 mole % of titania;
    30 to 45 mole % of calcia; and
    5 to 20 mole % of zinc oxide, wherein the titania/calcia molar ratio is at least 1, and the sintered body has a crystal structure in which a $Zn_2TiO_4$ phase is dispersed in a $CaTiO_3$ phase.

12. A magnetic head comprising a slider composed of a sintered ceramic consisting essentially of:
    40 to 60 mole % of titania
    10 to 50 mole % of calcia; and
    2 to 50 mole % of zinc oxide, wherein the titania/calcia molar ratio is at least 1, and the sintered ceramic has a crystal structure in which a $Zn_2TiO_4$ phase is dispersed in a $CaTiO_3$ phase; a magnetic pole piece mounted in the slider and bonding material bonding the pole piece to the slider.

13. A magnetic head comprising a slider composed of sintered ceramic consisting essentially of:
    45 to 60 mole % of titania;
    30 to 45 mole % of calcia;
    2 to 15 mole % of zinc oxide based on the three components; and
    3 to 15% by weight of zirconia based on the three components, said sintered ceramic having a crystal structure in which a $Zn_2TiO_2$ phase and a $CaZrTi_2O_7$ phase are dispersed in a $CaTiO_3$ phase; a magnetic pole piece mounted in the slider and bonding material bonding pole piece to the slider.

* * * * *